United States Patent [19]

Streck et al.

[11] 3,929,850

[45] Dec. 30, 1975

[54] PROCESS FOR THE PRODUCTION OF POLYMERIC HYDROCARBONS HAVING REACTIVE SILYL END GROUPS

[75] Inventors: Roland Streck; Heinrich Weber, both of Marl, Germany

[73] Assignee: Chemische Werke Huls Aktiengesellschaft, Marl, Germany

[22] Filed: Sept. 30, 1974

[21] Appl. No.: 510,761

Related U.S. Application Data

[62] Division of Ser. No. 306,989, Nov. 16, 1972, Pat. No. 3,857,825.

[30] Foreign Application Priority Data

Nov. 19, 1971 Germany.............................. 2157405

[52] U.S. Cl.......... 260/448.2 E; 117/161 R; 117/161 ZA;161/203; 161/242; 260/4 R; 260/23 R; 260/28.5 R; 260/33.6 UA; 260/41 R; 260/887; 260/889; 260/894; 260/46.5 R; 260/80 PS; 260/88.1 R; 260/93.1; 260/95 R; 260/448.8 R

[51] Int. Cl.². ......................... C07F 7/08; C07F 7/18

[58] Field of Search ............... 260/448.2 E, 448.8 R

[56] References Cited

UNITED STATES PATENTS

| | | | |
|---|---|---|---|
| 3,631,087 | 12/1971 | Lewis et al. .................. | 260/448.2 E |
| 3,694,478 | 9/1972 | Adams et al. ................ | 260/448.2 E |

*Primary Examiner*—Paul F. Shaver
*Attorney, Agent, or Firm*—Millen, Raptes & White

[57] ABSTRACT

Polymeric hydrocarbons having reactive silyl end groups are produced by conducting a catalyzed ring opening polymerization of a cyclic olefin in the presence of, or reacting with a polymeric hydrocarbon having an unsubstituted non-conjugated ethylenic double bond in a polymer unit thereof, an organic silicon compound having at least one nonconjugated unsubstituted double bond or a polymeric hydrocarbon having a non-conjugated unsubstituted terminal double bond, with an organic silicon compound having at least one organic group, bound to the silicon atom by a carbon-silicon bond, which contains at least one unsubstituted, non-conjugated acyclic double bond and having at least one silicon atom bearing, via a carbon-silicon bond, at least one substituent which is readily removable by hydrolysis.

19 Claims, No Drawings

3,929,850

PROCESS FOR THE PRODUCTION OF POLYMERIC HYDROCARBONS HAVING REACTIVE SILYL END GROUPS

This is a division of application Ser. No. 306,989, filed Nov. 16, 1972, now U.S. Pat. No. 3,857,825.

BACKGROUND OF THE INVENTION

This invention relates to a process for the production of polymeric hydrocarbons having reactive silyl end groups.

It is known that cyclic olefins having at least one unsubstituted ring double bond can be polymerized by opening of the ring employing the so-called metathetical catalysts. See, e.g., German Published Application DAS No. 1,299,868, (U.S. Pat. No. 3,458,489), German Unexamined Published Applications DOS No. 1,570,940 (U.S. Pat. No. 3,459,725), DOS No. 1,595,739 (U.S. Pat. No. 3,666,742) and DOS No. 1,645,038 (U.S. Pat. No. 3,476,728), British Pat. No. 1,124,456 (U.S. Pat. No. 3,492,245), British Pat. No. 1,194,013 (U.S. Pat. No. 3,492,278), British Pat. No. 1,182,975 (U.S. Pat. No. 3,502,626), and German Applications DOS No. 1,720,798, DOS No. 1,770,143 and DOS No. 1,805,158.

It is also known that open-chain monoolefins, in the presence of the metathetical catalysts, are molecular weight regulators in the polymerization of cycloolefins (German Published Applications DOS No. 1,919,047, DOS No. 1,945,358 [U.S. Application of Streck et al., Ser. No. 70,497, filed Sept. 8, 1970], DOS No. 2,046,722, DOS No. 2,058,183). They are also employed as degradating agents for polymers having in the main chain thereof an unsubstituted double bond (German Published Application DOS No. 1,929,140 and U.S. Pat. No. 3,558,589).

It is also known that polymers having functional terminal groups usable for further reactions, e.g., cross-linking reactions or the construction of other defined polymer structures, for example block copolymers, stellate polymers, etc., are of great interest from the standpoint of application technology. For example, in the reaction of a unilaterally lithium-terminated polymer, e.g., a polybutadiene or polystyrene produced employing a butyllithium as the catalyst, with a trior tetrahalogen compound, e.g., methyltrichlorosilane, silicon tetrachloride and carbon tetrabromide, a stellate structure results. A polymer halogen-terminated at both ends can be reacted with a unilaterally metal-terminated chain of another polymer to produce block copolymers. Hydroxyl-terminated polymer chains can be cross-linked with di- and/or tri- or polyisocyanates and/or analogous polyfunctional compounds, such as, for example, acid chlorides of polybasic acids. This enumeration, which is merely illustrative and is not complete, demonstrates that such reactions of "telechelic polymers" (see, e.g., U.S. Pat. No. 3,244,664) have gained increasing importance in recent times. Therefore, methods are being sought which yield polymers having defined functional end groups, especially since the introduction of functional end groups frequently also favorably affects the practical-application properties of the polymers, for example, improved adhesion to surfaces and/or compatibility with other polymers.

The introduction of reactive silyl end groups into polymeric hydrocarbons is of special importance, because, on the one hand, it is possible to apply to the thus-modified polymeric hydrocarbons the coupling and cross-linking principles known from silicone chemistry. On the other hand, the affinity of the reactive silyl group to oxidic and silicate surfaces, which effects a particularly good adhesion, is also exploited with polymeric hydrocarbons which possess an inexpensive hydrocarbon structure instead of an expensive polysiloxane skeleton.

It has been suggested to introduce reactive silyl groups into polymeric hydrocarbons by chemically adding silanes which contain, in addition to a silicon-hydrogen bond, a group which can readily be split off by hydrolysis, e.g., halogen or alkoxy, to several double bonds of the polymeric hydrocarbon. In this process, platinum compounds are utilized as the catalysts, (German DOS No. 1,720,527 and DOS No. 1,620,934). The disadvantage of that process is that the platinum, which is used in low concentrations as the catalyst, cannot economically be recovered. Therefore, the losses of platinum in the production of large amounts of polymeric silyl hydrocarbons would be intolerable.

For methods for effecting the hydrosilation of an unsaturated, rubbery polymer by purely thermal methods, i.e., without a catalyst, see U.S. Pat. No. 2,557,778 and U.S. Pat. No. 2,475,122. The required high reaction temperatures of about 300° C., apparently cause severe degradation of the polymers, because the hydrosilation products are always described as liquids. Such products are not suitable for general application and are useful only for special purposes.

A further method for the introduction of reactive silyl groups resides in the free radical addition to an unsaturated polymer of the sulfhydryl group present at the end of an alkyl group of a partially alkylated mercaptoalkyl silane, which silane also contains groups which are readily hydrolyzed. See U.S. Pat. No. 3,440,302. γ-Mercaptopropyltrimethoxysilane is mentioned as a preferred silane. However, such a compound is not an inexpensive silicon derivative.

Another disadvantage of the two above-mentioned processes is that it is impossible to regulate the location in the polymer of the attachment of the reactive silyl group. Due to the nonselective character of the addition reaction, it is improbable that the attachment occurs at the end groups of the polymer or proximate thereto. However, end group substitution would be optimal for the properties of the resulting polymer.

It is therefore an object of the present invention to provide a process which makes it possible in a simple manner to produce polymeric hydrocarbons having reactive silyl end groups.

Another object is the provision of novel polymers having reactive silyl end groups and intermediates for the production thereof. Other objects will be apparent to those skilled in the art to which this invention pertains.

SUMMARY OF THE INVENTION

According to this invention, polymers having reactive silyl end groups are produced by reacting, in the presence of a metathetical catalyst, one or both of a cycloolefin of 4, 5 or 7 or more ring carbon atoms having at least one non-conjugated unsubstituted double bond in the ring or a polymeric hydrocarbon having at least one non-conjugated unsubstituted double bond, with an organic silicon compound having at least one organic group, bound to the silicon atom by a carbon-silicon bond, which contains at least one unsubstituted, non-conjugated acyclic double bond, i.e., a double bond which is not part of a ring system, and having at least one silicon atom bearing, via a carbon-silicon bond, at least one substituent which is readily removable by hydrolysis.

DETAILED DISCUSSION

The term cyclic olefin or cycloolefin means an unsaturated hydrocarbon of one or more rings, at least one of which rings contain at least one unsubstituted non-conjugated double bond.

The cycloolefins polymerized according to the process of this invention preferably contain 4 to 12 ring carbon atoms and a total of 4 to 20, preferably 4 to 15 carbon atoms; from 1 to 3, preferably 1 to 2 rings, which can be fused or separate cycloaliphatic rings; whose ring carbon atoms are unsubstituted or one or more of which are substituted with lower-alkyl, e.g., of 1 to 4 carbon atoms, cycloalkyl, e.g., of 5 to 7 carbon atoms, or aryl, alkaryl or aralkyl, e.g., of 6 to 10 carbon atoms.

Preferred classes of starting cycloolefins are the following:

a. those containing 1 to 2 non-conjugated double bonds, preferably one;
b. those containing 1 to 2 rings, preferably one;
c. those of (a) and (b) containing two fused rings;
d. those of (a), (b), and (c) containing 0–2 lower-alkyl groups as the sole substituents on the ring carbon atoms, preferably 0;
e. those of (d) containing 1–2 methyl groups as the sole substituents on the ring carbon atoms;
f. those of (a), (b), (c), (d), and (e) wherein the unsaturated carbon atoms each bear a hydrogen atom; and
g. those of (a), (b), (c), (d), (e) and (f) wherein the ring of the cycloolefin containing the unsaturation contains 5 or 7 to 12 ring carbon atoms.

Examples of cycloolefins which can be employed in the process of this invention are cyclobutene, cyclopentene, cycloheptene, cis- and trans-cyclooctene, cyclononene, cyclodecene, cycloundecene, cis- and trans- cyclododecene, cis, cis-1,5-cyclooctadiene, 1-methyl-1,5-cyclooctadiene, 3-methyl-1,5-cyclooctadiene, 3,7-dimethyl-1,5-cyclooctadiene, cis,trans,trans-1,5,9-cyclododecatriene, trans,trans,trans-1,5,9-cyclododecatriene, 4,5-dimethyl-1,4,7-cyclodecatriene, 3-chloro-cyclooctene, 1,5-cyclododecadiene, norbornene, norbornadiene, dicyclopentadiene, dihydrodicyclopentadiene, the Diels-Alder adducts of hexachlorocyclopentadiene to norbornadiene ("aldrin") or to cis,-1,5-cyclooctadiene, 1,9-cyclohexadecadiene and the higher macrocyclics obtainable from butadiene according to DOS No. 2,103,369. Cycloolefins which cannot be polymerized under ring opening, e.g., cyclohexene and the derivatives thereof, are not employed in the process of this invention.

In place of, or together with, the above-defined cycloolefins, there can be employed in the process of this invention the open-chain or cyclic polymers thereof, viz., the so-called polyalkenamers, e.g., the unsaturated linear hydrocarbons as defined above, and also those not obtained by the ring-opening polymerization of cycloolefins. For example, there can be employed, not only the polybutenamers obtained from cyclobutene, cis,cis-1,5-cyclooctadiene and/or 1,5,9-cyclododecatriene, but also the unsaturated hydrocarbon which is substantially identical in structure and is directly obtained from butadiene in the presence of a Ziegler-Natta catalyst containing cobalt and/or iodine and titanium. Also suitable is the polyhexenamer which is indirectly obtained from ethylene and butadiene according to the process of U.S. Pat. No. 3,407,185 because its hypothetical parent substance, cyclohexene, cannot be polymerized by the ring opening. Also suitable are copolymers containing alkenamer units, such as, for example, copolymers of 1,4-butadiene or of piperylene with, e.g., styrene, isoprene, isobutylene, ethylene or propylene. Also suitable as substrates for the introduction of terminal silyl groups are copolyalkenamers, as they are obtained, for example, by the copolymerization of various cycloolefins, for instance according to the process of U.S. Pat. No. 3,502,626 or DOS No. 1,961,865, or by the subsequent metathetical reaction of polyalkenamers according to the procedure of DOS No. 2,058,198. Other suitable starting polymers for the process of this invention are polyalkenamers or copolyalkenamers wherein a portion of the double bonds are saturated, e.g., by hydrogenation and/or addition of halogens, (halo-) carbenes, hexachlorocyclopentadiene, or other groups which do not have an inhibiting effect on the catalyst.

Examples of cyclic olefins and polyalkenamers which can be employed in the process of this invention are monocyclic monoolefins of the formula

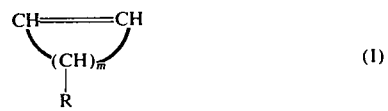

and the linear unsaturated polyalkenamers obtained by the ring-opening homopolymerization thereof of the formula

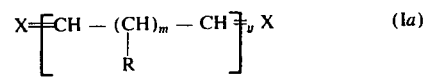

wherein X is a straight-chain or branched alkylidene group of 1 to 20 carbon atoms which may be substituted by cycloaliphatic and/or aromatic residues and/or by alkoxy and/or carbalkoxy groups and/or halogen atoms, R is hydrogen or a straight-chain, branched or cycloaliphatic saturated alkyl residue of 1 to 6 carbon atoms, or an aryl group of 6 to 10 carbon atoms; $m$ is the integer 2, 3, or an integer from 5 to 10, inclusive; and $y$ is an integer from 2 to about 50,000, preferably 5 to about 20,000.

The

groups can be alike or different, i.e., R can represent a hydrogen atom in every instance in the molecule or 1 to $m$ of the R groups can be an alkyl or an aryl group. Thus, by the ring-opening homopolymerization of unsubstituted monocyclic monoolefins, i.e., compounds of Formula I wherein R is hydrogen, there are obtained polymers of the formula:

$$X + CH - (CH_2)_m - CH +_y X \quad (Ib)$$

wherein X, y and m have the values given above.

Also suitable as starting cyclic olefins and polyalkenamers are monocyclic diolefins of the formula

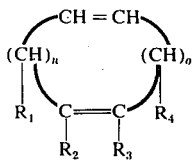
(II)

and the linear unsaturated polyalkenamers obtained by the ring-opening homopolymerization thereof of the formula

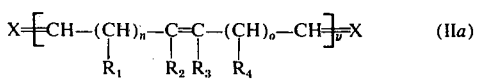
(IIa)

wherein, in Formulae II and IIa, X and Y have the values given above, and $R_1$, $R_2$, $R_3$ and $R_4$, which can be alike or different, each have the same values as R in formulae I and Ia and each of n and o are integers from 1–11, their sum being 3–12. All n of the $R_1$ groups and/or all of the $R_4$ groups can be hydrogen or from 1 to n of the $R_2$ groups and/or 1 to o of the $R_3$ groups can, respectively, be an alkyl or aryl group. Thus, polymers of the formula $$X + CH - (CH_2)_n - CH = CH - (CH_2)_o - CH +_y X$$
(IIb)

are obtained by the ring-opening homopolymerization of unsubstituted monocyclic diolefins of Formula II wherein X, y, n and o have the values given above and $R_1$, $R_2$, $R_3$ and $R_4$ are hydrogen atoms.

Also suitable starting materials are monocyclic triolefins of the formula

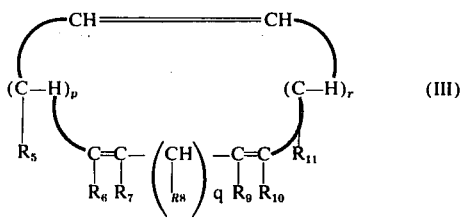
(III)

and the polyalkenamers obtained by the ring opening polymerization thereof of the formula

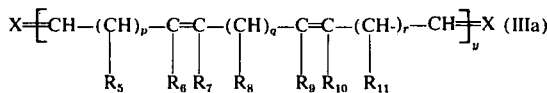
(IIIa)

wherein X and y have the values given above and $R_5$, $R_6$, $R_7$, $R_8$, $R_9$, $R_{10}$, and $R_{11}$ in the formulae III and IIIa each have the same values as R. The various $R_5$, $R_8$ and $R_{11}$ groups can be identical or different groups, i.e., all p of the $R_5$ groups, all q of the $R_8$ groups and/or all r of the $R_{11}$ groups can be hydrogen, or from 1 to p of the $R_5$ groups, 1 to q of the $R_{12}$ groups and/or 1 to r of the $R_{11}$ groups can, respectively, be an alkyl or aryl group. The same is true of the $R_6$, $R_7$, $R_9$, and $R_{10}$ groups, which likewise can all represent hydrogen, or individual or severally can be identical or different alkyl or aryl groups.

Also suitable as starting materials are norbornene and the polymers obtained thereof of the formula

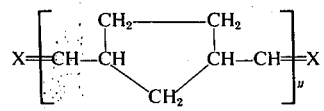
(IV)

In Formulae II, IIa, IIb, IIIa and IV, n and o each are integers from 1 to 11, the sum of which is an integer from 3 to 12; and p, q and r each are the integers 1 or 2.

Also suitable are polymers containing two or more of the above-disclosed polymer units in statistical distribution or in larger block sequences produced by the ring-opening copolymerization of two or more of the above described cycloolefins.

Suitable starting silicon compounds for the process of this invention are all organic silicon compounds which contain, in at least one organic group bound to silicon by a carbon-silicon bond, at least one unsubstituted, non-conjugated acyclic ethylenic double bond, i.e., a double bond which is not part of a ring system, and additionally contain, on at least one silicon atom bound via a carbon-silicon bond, at least one substituent which can readily be split off by hydrolysis. Preferred starting organic silicon compounds are those having a silyl group on each side of the double bond. Especially preferred are those wherein the substituents which can readily be removed by hydrolysis are halogen atoms, preferably chlorine atoms, e.g., vinylmethyldichlorosilane. However, it is also possible to utilize in the process of this invention organic silicon compounds having other substituents readily removable by hydrolysis, e.g., alkoxy, preferably of 1–4 carbon atoms, e.g., vinyltriethoxysilane, carboxylate, e.g., alkanoyloxy of 1–8 carbon atoms or carbocyclic aroyloxy of 6–12 carbon atoms, e.g., vinyltriacetoxysilane, or a ketoxime group, e.g., allyldimethyl-dimethyl-oximinosilane.

When using an organic silicon compound having one of the latter groups, i.e., which provides a donor function, a Lewis acid, preferably an alkyl aluminum or alkly aluminum halide, wherein alkyl is preferably of 1–4 carbons, more preferably methyl, or aluminum halide, preferably wherein the halide in each instance is chlorine, is employed therewith to compensate for the donor functions of the latter substituents, because otherwise the catalyst is inhibited. However, it is not always necessary to compensate each substituent with donor function by one mol equivalent of a Lewis acid. Instead, it is sufficient, for example, when using trialkoxysilanes or dialkoxysilanes, to employ 1 mol of a Lewis acid per mol of silane. One skilled in the art can readily determine the required amount of a Lewis acid by a simple series of experiments. (See Examples 6–9.)

Specific examples of suitable organic silicon compounds are vinyltrimethoxysilane, vinyldimethoxychlorosilane, allyldimethylacetoxysilane, dimethyloctadecen-(9)-yl-n-butoxysilane, allylcrotylpropoxyphenoxysilane, 1-trimethoxysilyl-4,9-decadiene, 1-dimethylallylsilyl-4-diethylethoxysilylbutane, dimethyloximinopropylphenylbuten-(1)-ylsilane, and preferably vinyltrichlorosilane, vinylmethyldichlorosilane, p-(β-trichlorosilyl)-ethylstyrene, allyltrichlorosilane, allylmethyldibromosilane, 1,2-bis(β-dimethylchlorosilyl)-ethyl-4-vinylcyclohexane, 1-trichlorosilyl-4,9-decadiene.

Particularly suitable are α,ω-bis(trichlorosilyl)-, α,ω-bis(dichloromethylsilyl)- and α,ω-bis(chlorodimethylsilyl)-alkenes of 4 to 20 carbon atoms in the alkenes chain, e.g., 1,10-bis(trichlorosilyl)-decenes, 1,10-bis(-dichloromethyl)decenes,1,8-bis(trichlorosilyl)octenes,1,8-dichloromethylsilyloctenes,1,8-bis(dimethylchlorosilyl)octenes, and analogous olefin derivatives having an interiorly positioned double bond carrying on both sides of the double bond at least one halosilyl group, respectively.

The bissilyl olefins particularly suitable for the process of this invention can easily be produced in accordance with conventional methods by the addition of trichlorosilane and/or methyldichlorosilane to triolefins. The triolefins are accessible conveniently and inexpensively according to procedures known in the art, e.g., 1,3,6-octatriene and 1,3,7-octatriene by the dimerization of butadiene; 1,4,9-decatriene by the cooligomerization of butadiene with ethylene; and 1,5,9-decatriene by metathesis of 1,5-cyclooctadiene with ethylene. The addition of the silanes to the aforementioned triolefins is catalyzed by platinum compounds. In this mode of production, a particularly advantageous fact is that the platinum catalyst remains in the residue during the distillation of the silyl olefins and can be reused and/or regenerated.

The starting organic silicon compound is generally employed in the process of this invention in amounts of 0.001–1.0 mol preferably 0.01–0.50 per mol of monomer (cycloolefin) or per mol of monomer units, when using an unsaturated polymer, the chain segment present between two double bonds of the main chain being treated as a monomer unit. The proportion of silicon compound employed is determined by the concentration of silyl end groups desired in the polymer and/or by the molecular weight thereof, which is inversely proportional thereto. (This inverse proportionality is a direct consequence of the metathetical reaction.) The silicon compound can, however, be also used in a great excess, based on the transition metal component of the catalyst, without any disadvantage, if it is borne in mind that the donor functions of the substituents readily removable by hydrolysis must be adequately compensated for by Lewis acids. The point in time at which the organic silicon compound is added also is not critical, insofar as this can be done, for example, in the polymerization of cycloolefins, prior to, during, or after the polymerization, but in any event prior to the inactivation of the polymerization catalyst. Corresponding considerations apply regarding the reaction with polymeric hydrocarbons. In this case, the organic silicon compound can be charged together with the catalyst or with the solution of the polymeric hydrocarbon, or it can be added to the mixture of the catalyst and the solution of the polymeric hydrocarbon. The organic silicon compound can also be added dropwise to the catalyst while in solution with the polymeric hydrocarbon.

It is advantageous to provide at least a portion of the organic silicon compound in the process of this invention initially, at the beginning of the reaction, because this precludes any formation of polymers which are too high a molecular weight, so that a low-viscosity, readily stirrable reaction mixture is always maintained. Because of the metathetical reaction between the organic silicon compound and an unconjugated, unsubstituted double bond in the main chain of the polymer, a break in the polymer chain occurs at the point where the new end group is thus created. Accordingly, the process of this invention is likewise suitable for controlling the molecular weight of the open chain polymers of cycloolefins as defined above and for reducing the molecular weight of polymeric hydrocarbons having in their main chain an unsubstituted double bond. This effect is particularly advantageous in producing easily processable reaction products.

A metathesis catalyst is employed in the process of this invention. As is known, metathesis catalysts are mixed catalysts containing a compound of a metal of Subgroups 5–7 of the Mendelyeer Periodic Table, usually niobium, tantalum, molybdenum, tungsten or rhenium, and also a metal of Main Groups 1 through 3 of the Mendelyeer Periodic Table and/or an alkyl or hydride compound thereof, which optionally can contain a further ligand in the molecule, such as, for example, halogen, alkoxy or carboxylate, as defined above or, in place thereof, a Lewis acid. As is known, metathetical catalysts can also contain further activating additives, e.g., an alcohol, epoxide, hydroperoxide, vinyl or allyl ether or ester, vinyl halide, or aromatic nitro compound.

When conducting the process of this invention, because conjugated diolefins, e.g., butadiene, have a very disadvantageous effect on the reaction catalyst, care should be take to ensure that even trace amounts are not present in the initial reaction charge. For example, vacuum degasification can be employed, if, for example, instead of dissolving a finished monomer-free, rubbery homo- or copolymer in a separate operation, there is employed a solution obtained directly from the production thereof.

Alkines, e.g., acetylene, 1-butyne, 2-butyne and phenylacetylene, are also strong catalyst poisons and if present in the starting charge must therefore likewise be removed to the maximum possible extent.

The reaction can be conducted in all solvents known to be suitable for polymerizations employing Ziegler-Natta catalysts. Aliphatic, alicyclic, aromatic hydrocarbons and the corresponding halogenated hydrocarbons, can be employed, preferably one or more of the following: pentane, hexane, heptane, n- and isooctane, isononane (hydrogenated trimer propene), n-decane, isodecane (hydrogenated tetramer propene), cyclopentane, cyclohexane, methylcyclopentane, methylcyclohexane, ethylcyclohexane, isopropylcyclohexane, cyclooctane, decahydronaphthalene, hydrogenated terpenes, such as pinane and camphane, cyclohexene and the substitution products thereof, benzene, toluene, o-, m-, p-xylene, ethylbenzene, o-, m-, p-diethylbenzene, n-propylbenzene, isopropylbenzene and other mono- to polyalkylbenzenes, tetrahydronaphthalene, methylene chloride, chloroform, carbon tetrachloride, 1,2-dichloroethylene, trichloroethylene, tetrachloroethylene, chlorobenzene, o-dichlorobenzene, trichlorobenzene (mixture of isomers), bromobenzene, fluorobenzene and 1,2-dichloroethane.

An essential condition of the solvent employed is that, by suitable purification, it is maximally free of water and other H-acidic compounds, as well as any other compounds having donor function (Lewis bases). Except for very small quantities thereof which are added in some cases to achieve specific effects, such impurities generally impair the activity of the catalyst.

The polymerization can be conducted continuously or discontinuously. The reaction temperature can vary widely, e.g., between −50° C. and +80° C. The reaction temperature is limited upwardly by the thermal stability of the selected catalyst downwardly by excessively reduced reaction velocity. Advantageously, a temperature of from −30° C. to +50° C., preferably from 0° C. to 30° C., is employed.

The polymeric hydrocarbons with reactive silyl end groups produced in accordance with the process of this invention are, depending on the molecular weight, the monomer building blocks on which they are based, and their microstructure, range from fluid to highly viscous liquids, pasty to waxy semi-solids, and elastomeric thermoplastic solids.

This wide variation in physical properties makes it possible, in conjunction with the variable functionality of the silyl end groups, to utilize the produce in a great variety of applications, for example as tackifiers for rubbers to adhere to silicate surfaces, e.g., glass fibers (in place of the hitherto customary tackifiers, such as γ-mercaptopropyltriethoxysilane) or as modifiers for silicone rubbers, oils, and resins. Numerous additional possibilities of application for polymers with reactive silyl end groups will be readily apparent to those skilled in the art.

A wide variety of convention additives can be incorporated in a conventional manner into the polymeric hydrocarbons produced according to the process of this invention, such as, for example, carbon black, talc, silicic acid and titanium dioxide, in order to improve the properties thereof. Furthermore, they can be oil-extended by means of paraffinic, aromatic, or naphthenic oils or esters, e.g., diisodecylphthalate. In order to improve the light stability and oxidation resistance, the customary stabilizers can furthermore be added thereto.

A particularly advantageous property of the compounds produced according to the process of this invention is that with a sufficiently high content of reactive silyl end groups in the polymeric hydrocarbons, i.e., less than about 200 carbon atoms in the polymer chain per silyl group, the cross-linking effected by the condensation of the silanol groups produced after the hydrolysis is generally sufficient to obtain a polymer network having good strength. To promote this reaction, the halosilyl groups can be converted, for example, into acetoxysilyl groups according to known principles of silicone chemistry, to produce polymers which cross-link spontaneously in the presence of moisture.

Another cross-linking possibility residues in hydrolyzing the silyl groups and adding to the resultant polymeric hydrocarbon containing silanol groups, a conventional cross-linking catalyst, e.g., dibutyltin dilaurate, tin(II) octoate, a zirconium or lead alcoholate, carboxylate, or chelate, an alkali hydroxide, alkali silanolate, or alkali siloxanate, or an amine, and optionally also an auxiliary cross-linking agent, e.g., tetraethyl silicate, ethyl polysilicate, methyltrimethoxysilane or triethoxysilane. In this case, a mass is obtained which vulcanizes at room temperature.

The polymers produced according to the process of this invention can be utilized not only as such, but also as a mixture with other conventional polymers, e.g., natural rubber, synthetic polyisoprene, cis-1,4-polybutadiene, 1,2-polybutadiene, copolymers of butadiene with isoprene, styrene, ethylene, butene-1, piperylene, and other mono-and diolefins, as well as EPDM and butyl rubber, polypentenamer, polyoctenamer, and polydodecenamer. It is also possible to cross-link the various polymeric hydrocarbons with reactive silyl end groups of this invention together, for example a polybutenamer unilaterally terminated by trimethoxysilyl groups with a polyoctenamer terminated bilaterally by dimethylacetoxysilyl groups, wherein the chain lengths can differ additionally. Such mixture can also be prepared in situ, e.g., by using mixture of unilaterally and/or bilaterally silyl-terminated olefins as regulators and/or modifiers during the polymerization of mixtures of cycloolefins or during the metathetical degradation of polyalkenamers and/or the mixtures thereof. For example, it is possible to utilize the mixture of 1:1- and 1:2-adducts (trichlorosilyldecadiene and bis (trichlorosilyl)decene), produced in case of an incomplete addition of trichlorosilane to trans-n-1,4,9-decatriene, in the polymerization of a mixture of cyclododecene, cyclododecadienes and cyclododecatriene obtained by the partial hydrogenation of 1,5,9 -cyclododecatriene.

Mixtures of modified and unmodified polyalkenamers can be produced in situ if the addition of silyl olefins is very small, or if they are employed together with other conventional regulators, e.g., acyclic olefins, unsaturated ethers, esters and halogenides. In many cases, a small proportion of a polymeric hydrocarbon containing silyl end groups is sufficient to attain specific advantageous effects, e.g., improved adhesion.

The polymeric hydrocarbons with reactive silyl end groups of this invention can subsequently be modified in a conventional manner, utilizing the reactivity of the unsaturated carbon atoms as well as the hydrogen atoms activated thereby and also the purely paraffinic or aromatic hydrogen atoms which are capable of reacting. Such a modification can have as its purpose the alteration of the behavior of the polymers with respect to certain solvents (solubility, wettability, swellability), influencing their compatibility with other polymers, increasing their stability with respect to degradation, or adapting them to a specific end use. The modification can also be effected on finished cross-linked coatings or molded articles, and in this case is effective predominantly only on the surface thereof. Subsequent modification reaction of polymers are known in great numbers and well described in prior art. The application of these reactions to the polymeric hydrocarbons with reactive silyl end groups of this invention can be effected in an analogous manner.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. Unless indicated otherwise, the reduced specific viscosity (RSV) of the polymers was determined in benzene at 25° C.

EXAMPLES 1–5 AND COMPARATIVE EXPERIMENT A

In a glass flask having a capacity of 1 liter and being equipped with three tubes, an agitating mechanism, and a reflux condenser and a dropping funnel, a mixture of 100 ml. (77.8 g.) of cyclopentene and 150 ml. of hexane, containing varying amounts of vinyltrichlorosilane (ViSiCl$_3$), were cooled to 0° C. and mixed with 0.5 millimol of tungsten hexachloride, 0.5 millimol of ethanol and 3 millimols of ethylaluminum dichloride. After 2.5 hours, the catalyst was destroyed by adding 50 ml. of methanol containing 3 g. of potassium hydroxide and 2 g. of 2,6-di-tert.-butyl-p-cresol ("Ionol"). To scrub out the catalyst residues, the reaction mixture was further stirred for three hours after the addition of 100 ml. of distilled water and 50 ml. of methanol thus forming a second phase consisting of 50% methanol. The phase was pipetted off and the mixture was then washed twice with 50% methanol. The polymer was precipitated by pouring the organic phase into 2 liters of methanol. After 2 hours of extracting the polymer with 500 ml. of pure methanol, the polymer was dried at 50° C. in a vacuum drying chamber for 40 hours. The thus-purified polymer was employed in determining the yield and the analytical data. In order to eliminate sources of error due to varying impurities in the solvent, in the monomer, or in the catalyst components, a blank experiment (Experiment No. A) was conducted without the addition of vinyltrichlorosilane. The results of these experiments are summarized in Table I below.

TABLE 1

| Experiment No. | Amount ViSiCl$_3$ mmol | Yield g. | % trans-Double Bonds* | RSV dl./g. | Gel % |
|---|---|---|---|---|---|
| A | — | 9.0 | 88 | 3.4 | 2 |
| 1 | 2 | 8.4 | 85 | 2.3 | 2 |
| 2 | 5 | 12.0 | 76 | 2.8 | 16 |
| 3 | 10 | 19.9 | 76 | 2.5 | 20 |
| 4 | 15 | 8.8 | 83 | 1.4 | 4 |
| 5 | 30 | 7.4 | 86 | 0.8 | 6 |

*Determined by IR spectrum

The high gel content in Examples 2 and 3 is probably due to the effect of moisture.

It can be seen from the RSV values of the polymers of those examples that vinyltrichlorosilane is very small quantities regulates the molecular weight of the thus-formed polypentenamer. In a certain range, it even effects an increase in yield.

EXAMPLES 6–8 and COMPARATIVE EXAMPLE B

Polymerization of Cyclopentene in the Presence of Vinyltrimethoxysilane

Analogously to Examples 1–5, 100 ml. (77.8 g.) portions of cyclopentene were polymerized in the presence of 5 mmol of vinyltrimethoxysilane, and in addition to the 3 mmol of ethylaluminum dichloride (EtAlCl$_2$) of the blank experiment (Comparative Experiment B), 0, 2.5 or 5.0 mmol of additional ethylaluminum dichloride was added in order to neutralize catalyst-inhibiting donor functions. The results of these experiments are summarized in Table 2.

TABLE 2

| Experiment No. | Amount of Vinyltrimethoxysilane | EtAlCl$_2$ mmol | Excess of EtAlCl$_2$ mmol | Yield g. |
|---|---|---|---|---|
| B | — | 3 | 0 | 9.2 |
| 6 | 5 | 3 | 0 | — |
| 7 | 5 | 5.5 | 2.5 | — |
| 8 | 5 | 8 | 5 | 17.2 |

These data demonstrate that an alkenyl trialkoxysilane can be employed by compensating only one of the three substituents with donor function by additional Lewis acid (Experiment 8). Similar results are obtained using an alkenyl dialkoxysilane, e.g., vinylmethyldimethoxysilane.

EXAMPLE 9

Polymerization of cis,cis-1,5-Cyclooctadiene in the Presence of Vinyltrichlorosilane In a three-necked flask having a 4 liter capacity and equipped with the above-described attachments, a solution of 216 g. (2 mols) of cis,cis-1,5-cyclooctadiene and 6.45 g. (40 mmols) of vinyltrichlorosilane (2 molar percent) in 1.5 l. of hexane was mixed at room temperature with 1.5 mmols of tungsten hexachloride, 1, mmol of ethanol, and 8, mmols of ethylaluminum dichloride. The temperature of the contents of the flask rose rapidly to 32° C. and the reaction mixture became viscous. After the addition of another 500 ml. of hexane, the mixture was further agitated at 20° C. for a total reaction time of 5 hours. After decomposition of the catalyst with 250 ml. of methanol, removal of a thus-separated blue-colored, low-viscosity, heavier phase by pipetting, and two after-washings with 200 ml. portions of methanol, a portion of the solvent (529 g.) was distilled off under normal pressure up to a bath temperature of 78° C. The remaining viscous residue (830 g.) contained, as determined by the precipitation and drying of a sample, 188.7 g. of a polymer having a RSV of 1.6 dl./g. with <2% by weight of gel, 54% trans- and 46% cis-double bonds. The silicon content was 0.21%.

EXAMPLE 10

Cross-Linking by Water of the Silicon-Containing Polybutenamer of Example 9

100 g. of distillation residue obtained according to the procedure of Example 9, containing 23.7 g. of polymer on the basis of a solids determination, was dissolved in 500 ml. of hexane and gradually mixed under agitation at 20° C. with 100 ml. of a mixture of 95% isopropanol and 5% water. A white gel was separated and after 1 hour at 20° C. and another 2 hours at 50° C., precipitation of the polymer was completed by pouring the mixture into 1 liter of methanol. In this way, 18.1 g. of a polymer was isolated which was 70.5% insoluble in benzene at 25° C. The RSV of the soluble proportion was 0.06 dl./g. This example shows that polymerization in the presence of only 2 molar percent of vinyltrichlorosilane, produces a polymer the predominant proportion of whose polymer molecules is modified so that they react with water with resultant cross-linking.

EXAMPLE 11

Production of an
α,ω-Bis(trichlorosilyl)polypentenamer 1,10-Bis(trichlorosilyl)-decene-(4) was produced from trans-n-1,4,9-decatriene, by the addition thereto of 2 mols of trichlorosilane at 130° C. in the presence of chloroplatinic acid. This compound, not heretofore described, was characterized by its infrared and nuclear resonance spectra, as well as by elementary analysis and the physical data of density (at 25° C.) = 1.235 and boiling point (145° C./0.2 torr [mm. Hg]). This compound is a colorless, oily liquid which does not fume in air, due to its low vapor pressure.

To a three-necked flask having a 2 liter capacity was added to a mixture of 250 ml. of hexane and 250 ml. of technical cyclopentene (content 92.6%), 2 mmols of tungsten hexachloride, 4 millimols of allyl-2,4,6-tribromophenyl ether, 2 millimols of ethanol and 10 millimols of ethylaluminum dichloride. The temperature rose from 0° to 10° C. within 2 minutes and the mixture quickly became viscous. Using one of the two dropping funnels attached to the flask, the dropwise addition of 245 g. = (198 ml.) of the above-described bis(trichlorosilyl)olefin was commenced. The mixture soon became less viscous. After 6 minutes, the temperature reached 31° C., and cooling with an ice-sodium chloride mixture became necessary. After 30 minutes, another 750 ml. of cyclopentene and 500 ml. of hexane were added dropwise and the reaction mixture was agitated for another 40 minutes, until the temperature had dropped to 5° C. To decompose the catalyst, 30 ml. of isopropanol containing 1 g. of stabilizer BKF (2,2'-dihydroxy-3,3'-di-tert.-butyl-5,5'-dimethyldiphenylmethane) dissolved therein was then added. In order to convert the polymer into a more manageable form which does not decompose to release hydrogen chloride, the polymer solution was stirred, in two portions, in respective 2 liter portions of methanol, the trichlorosilyl end groups thus being converted to trimethoxysilyl groups.

The thus-precipitated syrupy mass was stirred three times in successive 1000 ml. portions of methanol, Cross-Linking the methanol was substantially colorless and no longer exhibited a blue color. Remainders of methanol, monomer, and solvent were removed by heating under an oil pump vacuum in a forced circulation evaporator at 50° C. In this way, 526.9 g. of a very viscous syrup was obtained which solidified due to crystallization after 2 days. This effect, recognizable by a gradually spreading turbidity, could at any time be reversed by heating. It could be seen from the infrared spectrum that approximately 85% of the detectable double bonds was present in the trans-configuration, the remainder being in the cis-form. No vinyl groups could be observed, but Si-O absorptions occurred. The silicon content of the polymer was 0.6%, the molecular weight, determined by vapor pressure osmosis (numerical mean) was 2890 ± 5 %; the reduced specific viscosity was 0.67 dl./g.; and the proportion insoluble in benzene (gel) was <2%.

EXAMPLE 12

Cross of the Polymer of Example 11 by Water 10 g. of the $\alpha,\omega$-bis(trimethoxysilyl)polypentenamer of Example 11 was dissolved in 200 ml. of hexane. 40 ml. portions of this solution (corresponding to 2 g. of polymer) were poured on water-filled dishes having a surface area of 600 cm². Two of the samples did not receive any additive, two samples received 10 mg. portions of zirconium acetyl-acetonate [Zr(Acac)$_2$], and one sample received 10 mg. of dibutyltin dilaurate as cross-linking catalyst. After 1 hour, the catalyzed samples had already been cross-linked to such an extent that water droplets applied to the polymer film no longer penetrated and remained standing on top thereof. After 6 hours, an elastic, transparent rubber film was produced. The results of physical measurements on these products have been compiled in Table 3.

TABLE 3

| Catalyst | Cross-Linking Period | RSV dl./g. | Gel % |
|---|---|---|---|
| Non-Catalyzed | 6 hours | 1.05 | 3 |
| Non-Catalyzed | 24 hours | 0.81 | 11 |
| Zr(Acac)$_2$ | 6 hours | 0.64 | 51 |
| Zr(Acac)$_2$ | 24 hours | 0.63 | 49 |
| Bu$_2$Sn-dilaurate | 6 hours | — | 83 |

It can be seen from the above that the polymers produced according to the process of this invention gradually cross-link in the presence of water and that cross-linking is accelerated by catalysts conventional in silicone chemistry.

EXAMPLE 13

Production of an $\alpha,\omega$-Bis(trichlorosilyl)polyoctenamer

The same procedure was followed as described in Example 11, except that, in place of 1 liter (750 g.) of cyclopentene, 1 liter (840 g.) of cyclooctene was employed and the amount of 1,10-bis(trichlorosilyl)-decene-(4) employed was 311 g. (10 molar percent, based on the monomer). After converting the trichlorosilyl to trimethoxysilyl groups as described in Example 11, 612 g. of a polymer was obtained which at first was highly viscous and similarly crystallized after some time under turbidity. This polymer exhibited a molecular weight, determined by vapor pressure osmosis, of 2850 ± 5 %, RSV = 0.33 dl./g., <2% gel content, and was readily dissolved in hexane, benzene or tetrachloroethylene. The double bonds of this polymer were predominantly present in the trans-configuration and it contained 1.1% by weight of silicon.

EXAMPLE 14

Cross-Linking of the Polymer According to Example 13 by Water

As in Example 11, a solution of the $\alpha,\omega$-bis(trimethoxysilyl)polyoctenamer was produced (12 g. in 240 ml. of hexane) and poured on water-filled dishes having a surface area of 600 cm². Two 40 ml. samples (each corresponding to about 2 g. of rubber) lacked additive, while two additional samples were mixed with 20 mg. and 40 mg., respectively, of dibutyltin dilaurate. After either 6 hours or 16 hours at room temperature, the polymer films lying on top of the water were removed, rinsed with methanol, and dried in a desiccator with an oil pump for 12 hours. The determination of RSV and gel content provided the values compiled in Table 4.

TABLE 4

| Catalyst Dibutyltin Dilaurate | RSV After 6 Hours | Gel After 6 Hours | RSV After 16 Hours | Gel After 16 Hours |
|---|---|---|---|---|
| None | 0.37 | 6 | — | 94 |
| 20 mg. = 1 % | — | 94 | — | 93 |
| 40 mg. = 2 % | — | 93 | — | — |

It can be seen from the above that also this preparation can be cross-linked with the dibutyltin dilaurate catalyst.

EXAMPLES 15–17

Degradation of cis-1,4-Polybutadiene by Means of 1,10-Bis(methyldichlorosilyl)-decene-(4)

By the addition of 2 mols of methyldichlorosilane to n-1,4,9-decatriene, 1,10-bis(methyldichlorosilyl)-decene-(4) was produced. This compound, not as yet described heretofore, was characterized by elementary analysis as well as its infrared and nuclear resonance spectra. The boiling point of this compound is 133° C. at 0.2 torr, the density is 1.147. Just as the 1,10-bis(trichlorosilyl)-decene-(4) described in Example 11, this compound is also a colorless, oily liquid which does not fume in air.

A technically produced cis-1,4-polybutadiene ("BUNA" CB 10) was dissolved in an amount of perchloroethylene such that 100 ml. of the solution contained 10 g. of polymer. 1080 ml. portions, corresponding to 108 g. of polybutadiene (equal to 2 mols of monomer), of this solution was mixed in a three-necked flask of a 2 liter capacity with 1 mmol of tungsten hexachloride, 1 mmol of ethanol, varying amounts of 1,10-bis(methyldichlorosilyl)-decene-(4), and 5 mmols of ethylaluminum dichloride. The temperature of the portions rose from 25° C. to 27°–28° C., and after 4–5 minutes, the viscosity of the intensively agitated mixture was markedly reduced. After a reaction time of 20 minutes, the catalyst was destroyed by the addition of a solution of 0.5 g. of stabilizer BKF and 5 g. of potassium hydroxide in 50 ml. of methanol. The charge was finally alcoholyzed and precipitated by adding thereto 2000 ml. of methanol under agitation, washed out three times with 500 ml. of methanol, and dried. The results are set forth in Table 5 below.

TABLE 5

Silicon-Containing Degradation Products of cis-1,4-Polybutadiene

| Example No. | 16 | 17 | 18 |
| --- | --- | --- | --- |
| Bis(silyl)olefin added, g. | 14.7 | 36.6 | 73.2 |
| = mol % | 2 | 5 | 10 |
| Precipitatable polymer, g. | 107.0 | 107.0 | 108.1 |
| RSV, dl./g. | 0.89 | 0.68 | 0.63 |
| % Gel | <2 | <2 | <2 |
| Si content (% by weight) | 0.1 | 0.18 | 0.35 |
| % trans-Double bonds | 4 | 3 | 4 |
| Soluble degradation products, g. | 12.4 | 17.2 | 20.2 |
| % trans-Double bonds | 11.5 | 11 | 10 |

Also with these polymers, cross-linking experiments corresponding to Examples 12 and 14, respectively, can be conducted successfully.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for preparing liquid polymeric hydrocarbons having reactive silyl end groups by catalyzed ring opening polymerization of a cyclic olefin, which comprises reacting:
   a. a cyclomonoalkene or non-conjugated cyclopolyalkene monomer capable of catalytic ring opening polymerization having at least one metathetical unsubstituted, ethylenically unsaturated double bond in a hydrocarbon ring which contains 4, 5, 7 or more ring carbon atoms;
   b. about 0.001–1.0 mole per mole of said monomer of a tetrasubstituted organic silicon compound consisting essentially of
      i. at least one metathetical organic group having at least one unsubstituted, ethylenically unsaturated, non-conjugated, acyclic double bond, which group is bonded to silicon via a carbon-silicon bond;
      ii. at least one hydrolyzable group bonded to a silicon atom via a carbon-silicon bond, selected from the group consisting of halogen, lower alkoxy, lower alkanoyloxy, carbocyclic aroyloxy of 6–12 carbon atoms and lower ketoxime; and
      iii. any remaining silicon valences bearing a carbon-silicon bond; in the presence of
   d. a catalytic amount of a cycloolefin metathesis catalyst comprising:
      i. a halogenated compound of a metal in Subgroups 5–7 of the Mendeleyeev Periodic Table; and
      ii. a metal, metal alkyl or metal hydride of a metal in Main Groups 1–3 of the Mendeleyeev Periodic Table;
   in a reaction media substantially free of conjugated diolefins, alkines, water and H-acidic compounds, at a temperature of about −50° C. to +80° C. to form a liquid polymeric hydrocarbon chain having reactive silyl end groups.

2. A process according to claim 1, wherein the metathesis catalyst further comprises an activator selected from the group consisting of an alcohol, epoxide, hydroperoxide, vinyl or alkyl ether or ester, vinyl halide or aromatic nitro compound.

3. A process according to claim 1, wherein the metal of catalyst component (i) is selected from the group consisting of niobium, tantalum, molybdenum, tungsten and rhenium.

4. A process according to claim 1, wherein the metathesis catalyst component (ii) contains a halogen, alkoxy, carboxylate or Lewis acid.

5. A process according to claim 1, wherein said monomer is a cycloolefin of 4–12 ring carbon atoms and a total of 4–20 carbon atoms in 1–3 cycloaliphatic rings, the ring carbon atoms of which are unsubstituted or one or more of which are substituted by alkyl of 1–4 carbon atoms, cycloalkyl of 5–7 carbon atoms, or aryl, alkaryl or aralkyl of 6–10 carbon atoms.

6. A process according to claim 5, wherein said cycloolefin contains 1 or 2 non-conjugated double bonds and 1 separate or 2 fused rings having 0–2 lower alkyl groups as the sole substituents on the ring carbon atoms.

7. A process according to claim 6, wherein said cycloolefin contains a single double bond in a single ring having 5 or 7–12 ring carbon atoms and wherein the unsaturated carbon atoms each bear a hydrogen atom.

8. A process according to claim 1, wherein said organic silicon compound is one having a silyl group on each side of said acyclic double bond.

9. A process according to claim 1, wherein the hydrolyzable group of said organic silicon compound is a halogen atom.

10. A process according to claim 9, wherein said halogen atom is chlorine.

11. A process according to claim 10, wherein said monomer is cyclopentene, cyclooctene or cis, cis-1,5 cyclooctadiene.

12. A process according to claim 8, wherein the organic silicon compound is selected from the group consisting of α,ω-bis (tri-chlorosilyl)-, α,ω-bis (dichloromethylsilyl)- and α,ω-bis (chlorodimethylsilyl)-alkenes of 4–20 carbon atoms in the alkene chain.

13. A process according to claim 11, wherein the organic silicon compound is 1,10-bis (methyldichlorosilyl)-decene-(4).

14. A process according to claim 1, wherein the polymeric hydrocarbon product is one having less than about 200 carbon atoms in the polymer chain per silyl end group.

15. A process according to claim 1, wherein the hydrolyzable group of said organic silicon compound is alkoxy, alkanoyloxy, carbocyclic aroyloxy or ketoxime, further comprising effecting the reaction in the presence of sufficient Lewis acid to compensate for the electron donor function of said hydrolyzable group which would otherwise inhibit the catalyst.

16. A process according to claim 15, wherein the Lewis acid is a component of the metathesis catalyst.

17. A process according to claim 15, wherein the Lewis acid is an alkyl aluminum, alkyl aluminum halide or aluminum halide.

18. A process according to claim 17, wherein the alkyl is one of 1–4 carbon atoms and the halide is chlorine.

19. A process according to claim 1, wherein 0.01–0.5 mole of organic silicon compound is employed per mole of said monomer.

* * * * *